United States Patent
Böhm et al.

(10) Patent No.: US 6,476,520 B1
(45) Date of Patent: Nov. 5, 2002

(54) PLUG CONNECTION

(75) Inventors: Alfred Böhm, Veichtach (DE); Reihhold A. Barlian, Bad Mergentheim (DE); Rainer Lang, Röttingen (DE)

(73) Assignee: BARTEC Componenten und Systeme GmbH, Bad Mergentheim (DE)

( * ) Notice: Subject to any disclaimer, the term of this patent is extended or adjusted under 35 U.S.C. 154(b) by 0 days.

(21) Appl. No.: 09/423,438

(22) PCT Filed: May 4, 1998

(86) PCT No.: PCT/EP98/02626

§ 371 (c)(1),
(2), (4) Date: Nov. 9, 1999

(87) PCT Pub. No.: WO98/52172

PCT Pub. Date: Nov. 19, 1998

(30) Foreign Application Priority Data

May 9, 1997 (DE) .......................................... 197 19 730

(51) Int. Cl.[7] ................................................. H02J 3/00
(52) U.S. Cl. ................... 307/104; 340/310.01; 439/950
(58) Field of Search ...................... 307/104; 340/310.01, 340/572.1–572.9, 568.1–568.4, 310.06–310.08; 439/38, 620, 950; 361/58

(56) References Cited

U.S. PATENT DOCUMENTS

| | | | | |
|---|---|---|---|---|
| 3,995,209 A | * | 11/1976 | Weston ......................... | 323/44 |
| 4,303,902 A | * | 12/1981 | Lesster et al. ................ | 336/83 |
| RE31,524 E | * | 2/1984 | Hoebel ........................ | 307/149 |
| 4,543,455 A | | 9/1985 | Pollerspöck | |
| 4,788,448 A | * | 11/1988 | Crowe ......................... | 307/31 |
| 4,806,928 A | * | 2/1989 | Veneruso ..................... | 340/856 |
| 4,924,171 A | * | 5/1990 | Baba et al. .................. | 323/347 |
| 5,210,519 A | * | 5/1993 | Moore ......................... | 340/310 |
| 5,422,519 A | * | 6/1995 | Russel ......................... | 307/104 |
| 5,712,631 A | * | 1/1998 | Lewis et al. ............... | 340/853.1 |
| 5,963,349 A | * | 10/1999 | Norte ......................... | 359/116 |

FOREIGN PATENT DOCUMENTS

| | | |
|---|---|---|
| DE | 27 52 783 B1 | 1/1979 |
| DE | 36 44 868 A1 | 3/1988 |
| DE | 40 33 052 | 4/1992 |
| DE | 43 44 071 | 7/1995 |
| EP | 0 666 631 A2 | 1/1995 |
| EP | 0 666 631 | 8/1995 |
| GB | 223-8791 A * | 10/1989 |

OTHER PUBLICATIONS

Ole Cramer Nielsen, "IS–16, Intrinsically Safe P–NET," 2nd *International Conference on P–NET Fieldbus System*, Deggendorf, Germany, Dec. 1, 1992.

R. Brandel et al., "Mess–und regelungstechnische Anlagen in explosionsgefährdeten Bereichen," *der elektromeister + deutsches elektrohandwerk*, pp. 349–352, Jun. 1985.

* cited by examiner

*Primary Examiner*—Fritz Fleming
*Assistant Examiner*—Roberto J. Rios
(74) *Attorney, Agent, or Firm*—Jacobson Holman PLLC (57) ABSTRACT

A plug connection for a hazardous location for energy and data transmission by means of electrical quantities in a bus system has a primary part and a secondary part constructed as transmitters, as well as limiting means for the electrical quantities to be transmitted. The limiting means are located in the primary part and are designed for limiting the electrical quantities to be transmitted to the secondary part to values allowed for the particular type of protection.

26 Claims, 5 Drawing Sheets

PLUG CONNECTION

CROSS-REFERENCE TO RELATED APPLICATIONS not applicable

STATEMENT REGARDING FEDERALLY SPONSORED RESEARCH AND DEVELOPMENT not applicable

REFERENCE TO A "MICROFICHE APPENDIX"

not applicable

BACKGROUND OF THE INVENTION

1. Field of the Invention

The invention relates to a plug connection for a hazardous location for energy and data transmission between at least one electrical load and a bus system, having a primary part and secondary part constructed as transmitters, the primary part and secondary part being separable and connectable and with a converter associated with the primary part, and to an energy and data transmission method for hazardous locations, in which energy and data can be transmitted by means of a bus system to a primary part of at least one such plug connection and which energy and data are transmittable from a secondary part of the plug connection to at least one load.

A comparable plug connection for energy and data transmission is known from DE 40 33 052 C2. The known plug connection has a transmitter with a primary and a secondary part, which are separable and usable in combination. The primary part also has a converter means for the demodulation of data transmitted from the load cell as a sensor to the evaluating unit. However, this known plug connection is not intended for a hazardous location and is also not designed for such, because e.g. there are no limiting means for the electrical quantities to be transmitted.

It is necessary in numerous applications to transmit energy and data to loads in hazardous locations. In the present sense loads generally means sensors and actuators. Reference is made in exemplified manner to level gauges for oil or liquefied petroleum gas tanks.

2. Description of the Related Art

Numerous transponder methods are known, in which receivers located in hazardous locations are activated in an intrinsically safe manner by radio data and energy transmission. The energy necessary for transmitting back a response of the receiver, is also transmitted by means of the RF transmitted power. For this purpose the receiver has corresponding antenna. However, the transmitted power is so low that in general no sensors or actuators can be operated.

Therefore proposals have already been made for carrying out the energy and data transmission to such sensors or actuators using bus systems. A lecture by Mr. Cramer Nielsen at the "2nd International Conference on P-NET Field Bus Systems" on Nov. 30, 1992 and Dec. 1, 1992 in Deggendorf disclosed a field bus system for intrinsically safe, explosion-proof loads. The overall bus system corresponds to the requirements of "IS-16, intrinsically safe P-NET bus". It is therfore completely constructed in the type of protection "intrinsically safe". Energy and data are jointly transmitted by means of a two-wire bus line. The associated plug connection operates inductively and has two facing coils in cup cores. However, as a result of the construction in the type of protection "intrinsically safe" the efficiency of this bus system is not very high. As this type of protection only allows an extremely low electric power, it is only possible to connect a relatively small number of loads to the bus system. It is in particular impossible with this bus line system to supply loads with a type of protection other than "intrinsically safe" or with no type of protection and correspondingly increased power consumption data in addition to loads constructed in intrinsically safe and explosion-proof form. Therefore the flexibility of this transmission system is very low. As energy and data are transmitted on the same line, the maximum information density of the bus system is also reduced. As a result of dispersion in lines or electronic components there is also a mixing of signals. This can only be obviated by reducing the number of bus nodes to be supplied or reducing the data transmission rate. However, both measures are highly undesired.

DE-43 44 071 A1 discloses a transmission system for hazardous locations. In this system the bus system is once again constructed in an intrinsically safe, explosion-proof manner and consequently has the same disadvantages as described in the preceding paragraph.

EP 0 666 631 A2 discloses a supply system for a field bus in hazardous process engineering installations. Energy and data are transmitted via the same pair of wires. On the way from a waiting bus to the terminals for intrinsically safe, explosion-proof loads, current and voltage limiting means are arranged in spatially separated manner. One of the limiting means is located in a distributor immediately upstream of the connections for the loads. Optionally said limiting means can be obviated or modified, so that also loads, which are constructed in a type of protection other than "intrinsically safe" or with no type of protection can be connected. However, it is disadvantageous that for each connection the maximum transmittable electric power is fixed and also either the current or the voltage is highly limited even for the not intrinsically safe connections.

DE 27 52 783 B1 discloses a plug connection for medical equipment, e.g. for transmitting ECG signals to an evaluating unit. In this plug connection the energy transmission from the equipment takes place with a corresponding energy supply part via an inductive transmitter to the secondary part. In said equipment data transmission takes place by means of an optoelectronic line, e.g. from the ECG, via the secondary part to the primary part. However, this equipment neither has limiting devices, particularly for the energy transmission, nor is there a bidirectional data transmission. Thus, this equipment is unsuitable for hazardous locations.

The document "der elektromeister+deutsches elektrohandwerk, 1985, No. 6 pp 349 to 352" discloses requirements for installations in hazardous locations. However, the barriers provided therein solely constitute wired-in current-voltage barriers, which can only be used to a limited extent for data transmission. It provides no teaching as to how a plug-in data and energy transmission device should be designed for hazardous locations.

DE 36 44 868 A1 relates to a connection for a subscriber to a local network. However, this document only discloses a two-wire line by means of which energy and data are transmitted, so that this leads to a considerable limitation when transmitting energy and data. In addition, the corresponding connection is not of the plug-in type, so that the desired flexibility for an easy adaptation for the power requirement of different sensors or actuators does not exist.

BRIEF SUMMARY OF THE INVENTION

Therefore the object of the invention is to overcome the preceding disadvantages and provide a plug connection for energy and data transmission for loads such as sensors and actuators in hazardous locations, in which a high efficiency and flexibility are provided by said plug connection. In addition, an energy and data transmission method for hazardous locations is to be provided, with which a high reliability can be achieved.

According to the invention, this object is achieved with a plug connection for a hazardous location for energy and data transmission between at least one electrical load and a bus system, having a primary part and secondary part constructed as transmitters, the primary part and secondary part being separable and connectable and with a converter associated with the primary part, as a result of its having the features of the bus system being connected to the plug connection in each case via separate energy and data supply lines, at least in the primary part limiting means being provided for the electrical quantities to be transmitted, and at least the secondary part being associatable with the hazardous location. In the case of an energy and data transmission method for hazardous locations, the object is achieved by the features that in the primary part the type of protection of the connected load is determined and that the electrical quantities to be transmitted are limited to maximum values corresponding to the determined type of protection.

An essential idea of the invention is that energy and data are to be supplied by separate supply lines from the bus system to the plug connection and only in the plug connection, at least in the primary part, are provided limiting means for the corresponding electrical quantities. At least the secondary part is located in the hazardous location.

As a result of the design of the plug connection according to the invention, it is also possible to locate the overall plug connection or even the plug connection and the bus system in the hazardous location. In this case a high data transmission rate is possible and the design very flexibly allows the connection of loads via the plug connection in the hazardous location, which loads require different power levels.

Thus, as desired, it is possible to implement the connection of loads, which are constructed in the type of protection "increased safety" or in other types of protection and having a correspondingly higher power consumption. Simple equipment can also be connected.

In that in the primary part of a plug connection limiting means are provided, which are designed for limiting electrical quantities to be transmitted to a secondary part to values permissible for the type of protection increased safety (e) or intrinsic safety (i) or other types (e.g. m, d, p, q, s, o), it is possible to plug sensors and actuators in the hazardous location. To this end the limiting means individually limits the electrical quantities to be transmitted to the in each case permissible values. This simultaneously ensures a very high efficiency and flexibility of the plug connection. The plug connection can be operated in a bus system in intrinsically safe and non-intrinsically circuits and supply loads with different types of protection. As a result of the high efficiency and flexibility of the plug connection according to the invention, it is possible to construct an extremely advantageous transmission system for hazardous locations.

Since, in addition, at least the primary part has a converter, at least for the data, a possibility is created for increasing the power in a plug connection according to the invention. Thus, the electrical quantities can be transmitted to the plug connection in a transmission form optimized for the transmission characteristics of the bus system. Only in the primary part of the plug connection is there a transformation into signal forms optimized for the transmission mode of the plug connection. These signal forms can be clocked or modulated signals.

According to an advantageous embodiment the converter is a modulator-demodulator, which converts the incoming digital pulses into signal forms optimized for transmission. These can e.g. be FSK or other frequency-modulated or also amplitude-modulated, as well as other modulation types. As the secondary part also contains a modulator-demodulator, a re-transforming of the signal form can take place there. In this case the plug connection is also suitable for a reverse data transmission.

For improving the transmission characteristics it is also advantageous if the primary part and optionally also the secondary part in each case have a transceiver. Transceivers are necessary for e.g. converting differential signals from the leads into logic levels. As a result of the transceiver located in the plug connection, the signal forms to be transmitted are directly formed at the transmission-critical transition from primary part to secondary part. As a result of this measure the data loss is very low.

It is also advantageous for the primary part to have a microprocessor and an addressable memory, particularly an EEPROM. This measure permits an addressing of the primary part. Only the data addressed to the particular plug connection are transmitted to the secondary part. Thus, the energy transmission can also be selectively controlled.

In a particularly preferred embodiment of the plug connection the primary part has a device for monitoring the load of the load connected to the secondary part, which limits the electrical quantities supplied to the secondary part as a function of the type of protection of the connected load.

This permits a very high degree of automation of the plug connection according to the invention. There is no need to transmit separate information through the bus system to the plug connection revealing the maximum values of the electrical quantities to be transmitted. Only information from the secondary side is required leading to an automatic adaptation. These can be self-identification data of the load and/or secondary part. The load monitoring device transforms the information obtained into instructions to the limiting means.

A particularly save development of the load monitoring device only activates the energy transmission from the primary part when a signal is received from the secondary part ensuring that the connected load operates correctly. Such a signal can be an alternating signal, whose frequency and phase are checked, or a digital signal with coded and checkable information. In particular, the energy transmission is disconnected if no secondary part is connected.

It is also advantageous to provide in the secondary part a non-volatile memory, e.g. an EEPROM in conjunction with a microprocessor, in which is stored an address and/or further characteristics of the plug connection and/or the connected load. This in particular provides a very effective possibility for supplying the device for the load monitoring of the primary part with self-identification data of the secondary part or the connected load.

One energy saving measure consists of providing a microprocessor in the secondary part and which on receiving data from the bus system addressed to the plug connection activates the electronic components of the secondary part. Otherwise these components are disconnected and consume no current.

It is very advantageous to inductively design the transmitters for the electrical quantities between the primary and secondary parts. This simultaneously leads to advantageous galvanic separation or isolation between bus system and load.

In the present application the term galvanic separation in the sense of a safe galvanic separation means a separation in accordance with standards IEC79-3 and EN50020.

Inductive transmission takes place particularly well through primary and secondary-side coils, which are positioned respectively in primary and secondary side ferrite cores. Ferrite cores ensure an increase in the transmission efficiency.

In order to exclude the possibility through the linking up of annular, conductive objects, which can also be called "reception structures" of inducing currents and possibly sparks therein, in the primary and secondary parts are located materials having a low permeability, e.g. a synthetic material or plastic. They also ensure a minimum spacing from the reception structure, so that the stray field strength is attenuated to values no longer sufficient to generate a spark.

Good results are obtained on forming an air gap adapted to type of protection (d) and when a protective device for monitoring the air gap is provided. The protective device detects a drawing apart of the air gap and in this case immediately indicates to the limiting means that the maximum values of the electrical quantities to be transmitted are to be reduced in accordance to the resulting changed connection conditions of the primary part. It is also possible to provide a mechanical protective device, which on drawing apart the air gap lowers the transmission efficiency by removing the primary and secondary-side transmission components from one another.

The air gap advantageously extends from a space between the ferrite cores and a threaded connection or some other lokking mechanism, e.g. a bayonet, between a box nut and the primary-side plug casing, as well as a space between the box nut and a secondary-side plug casing. The protective device for monitoring the air gap can be designed in such a way that an opening of the locking mechanism is detected. Through a mechanical protective device it is possible to link the opening of the locking mechanism with separation of the coils.

For the primary-side casing of the plug connection it is possible to use the constructions pressure-tight enclosure (d), sealed enclosure (m), other types of protection or a combination thereof.

Data transmission can also take place very efficiently through an optical device.

In principle, it is also possible to have a device provided with electrical contacts for transmitting electrical quantities between the primary part and the secondary part.

As described hereinbefore, an advantageous use of the plug connection according to the invention takes place with a bus system, which is constructed in a type of protection other than "intrinsically safe" or in no type of protection. In this way the full efficiency and flexibility of the plug connection is utilized. However, use is not limited thereto. The bus system could also be constructed in the intrinsically safe type of protection (i).

The bus installation can e.g. be constructed in the type of protection increase safety (e). For example, the bus installation can be designed for 24 V/4 A.

The bus system can be constructed as a three-conductor or multiconductor system. For increasing the information density the bus system can be equipped with e.g. at least four lines and a shield. At least two lines are used for energy transmission and at least two further lines for information transmission. The lines for information transmission can uninterruptedly transmit data and there is no undesired mixing with the signal forms necessary for energy transmission. There is also increased noise immunity and simpler circuitry.

A suitable bus topology is the nodal point arrangement, in which the nodal points are terminals with the type of protection "increased safety" or rigid connections, e.g. soldered joints corresponding to the type of protection "increased safety". These measures enable the type of protection (e) to be particularly easily maintained. The bus line can itself have a stub, tree or ring structure.

In the case of an energy and data transmission method for hazardous locations, according to the invention in a primary part of a plug connection the type of protection of a connected load is determined or predetermined and the electrical quantities to be transmitted are limited in accordance with the determined or predetermined type of protection. In a particularly advantageous way this method makes it possible to supply loads having different types of protection. In particular, sensors and actuators can be plugged in in hazardous locations. For this purpose the maximum values of the electrical quantities to be transmitted are adapted to the in each case permissible values.

It is in particular ensured that, with the secondary part removed, the maximum values are limited to those allowed for the type of protection "intrinsically safe". It is e.g. possible to drop down to a low power of e.g. 2 W, which is just sufficient for reliably establishing the connection conditions. When the secondary part is removed, the electromagnetic field of the primary part must not be able to cause an ignition with respect to explosive mixtures.

Appropriately the starting values at the primary part in the unplugged state are limited to <1.2 V, <0.1 A, <20 $\mu$J or <25 mW. These values are not exceeded in the case of loads with the definition "simple equipment" (DIN EN 50 014/VDE 0170/0171, part 1/05/78, section 1.3).

The energy and data transmission method is advantageously performed with a plug connection according to the invention.

The invention is described in greater detail hereinafter relative to non-limitative embodiments and the attached drawings, wherein show:

DETAILED DESCRIPTION OF THE INVENTION

Figure 1:
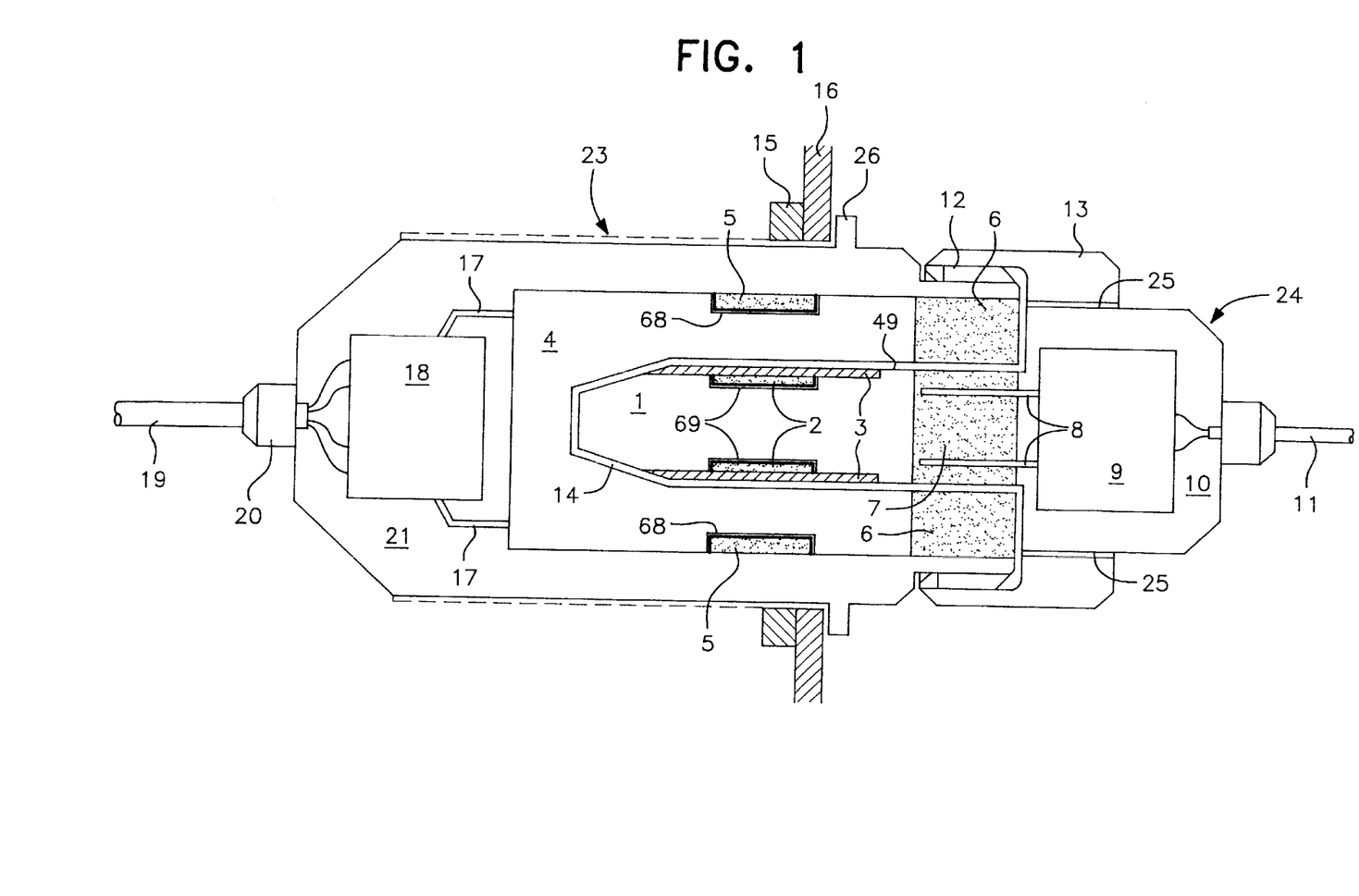
FIG. 1 A cross-section through a plug connection according to the invention.

The cross-section through a plug connection according to the invention shown in FIG. 1 has a primary part 23 and a secondary part 24. The primary part 23 is constructed in the type of protection (m, d) or some other type or a combination thereof (m, e(i)). The secondary part 24 can be constructed in the type of protection "intrinsically safe" (i). Energy and data pass via a bus cable 19 through an optionally pressure-resistant screw coupling 20 into a primary-side plug casing 21, which is constructed in one of the types of protection m, d, p or q or some other type. The four bus lines are fed to the primary-side electronic module 18, described in greater detail hereinafter. The electrical signals electronically processed and inductively transmittable in electronica module 18 are transmitted via the primary-side connections 17 to a primary-side coil 5. The coil 5 is located in a primary-side ferrite core 4, whose material characteristics are chosen in accordance with the frequencies to be transmitted, so that a good transmission efficiency of the inductive transmission is possible. A secondary-side coil 2 is wound onto a mandrel-like ferrite core 1 of the secondary part 24 roughly to half the height of the mandrel. In the completely plugged-in state of the plug connection the primary and secondary-side coils 5, 2 are arranged coaxially in the same, axial segment. The secondary-side coil 2 is surrounded by an insulation 3, which serves to protect the windings. The primary and secondary-side coils 5, 2 are in each case insulated by an insulation 68, 69 against the ferrite cores 4, 1 surrounding them.

The electrical signals inductively transmitted on the secondary-side coil 2 are transmitted by means of secondary-side connecting wires 8 to a secondary-side electronic module 9 in a secondary part casing 10. The processed electrical signals then pass via a secondary-side connecting cable 11 to a piece of equipment, device or load, e.g. a resistance sensor. Answer-back signals from the equipment or load pass through the plug connection in the reverse order.

To the face of the primary part 23 is fitted an annular attachment 6 made from a poorly magnetically conducting material, e.g. plastic, which acts as a combined centring device and spacing part. The base segment 7 of the mandrel-like ferrite core 1 of the secondary part 24 is also made from a poorly magnetically conducting material, e.g. a plastic. Apart from the centering of the primary and secondary parts 23, 24 and mechanical protection, said plastic segments serve to minimize a possible energy transmission from or to the coil 5 by induction in a linked up reception structure, because they act as a magnetic insulator. Over the attachment 6 is placed a box nut 13 for fixing the secondary part 24. The box nut 13 and attachment 6 are screwed together at the joining faces by thread 12. Alternatively it is possible to have a bayonet closure. A clearly defined air gap 49 necessary for a type of protection passes from the space 14 between the secondary-side ferrite core 1 and the primary-side ferrite core 4 along the space between the attachment 6 and the base segment 7, as well as the secondary-side casing 10 via the thread 12 or the space 25 between the secondary-side casing 10 and the box nut 13 to the outside. The primary part 23 and secondary part 24 are safely galvanically separated from one another. The primary-side casing 21 is fixed by projections 26 and a threaded ring 15 to a casing wall 16.

Figure 2:
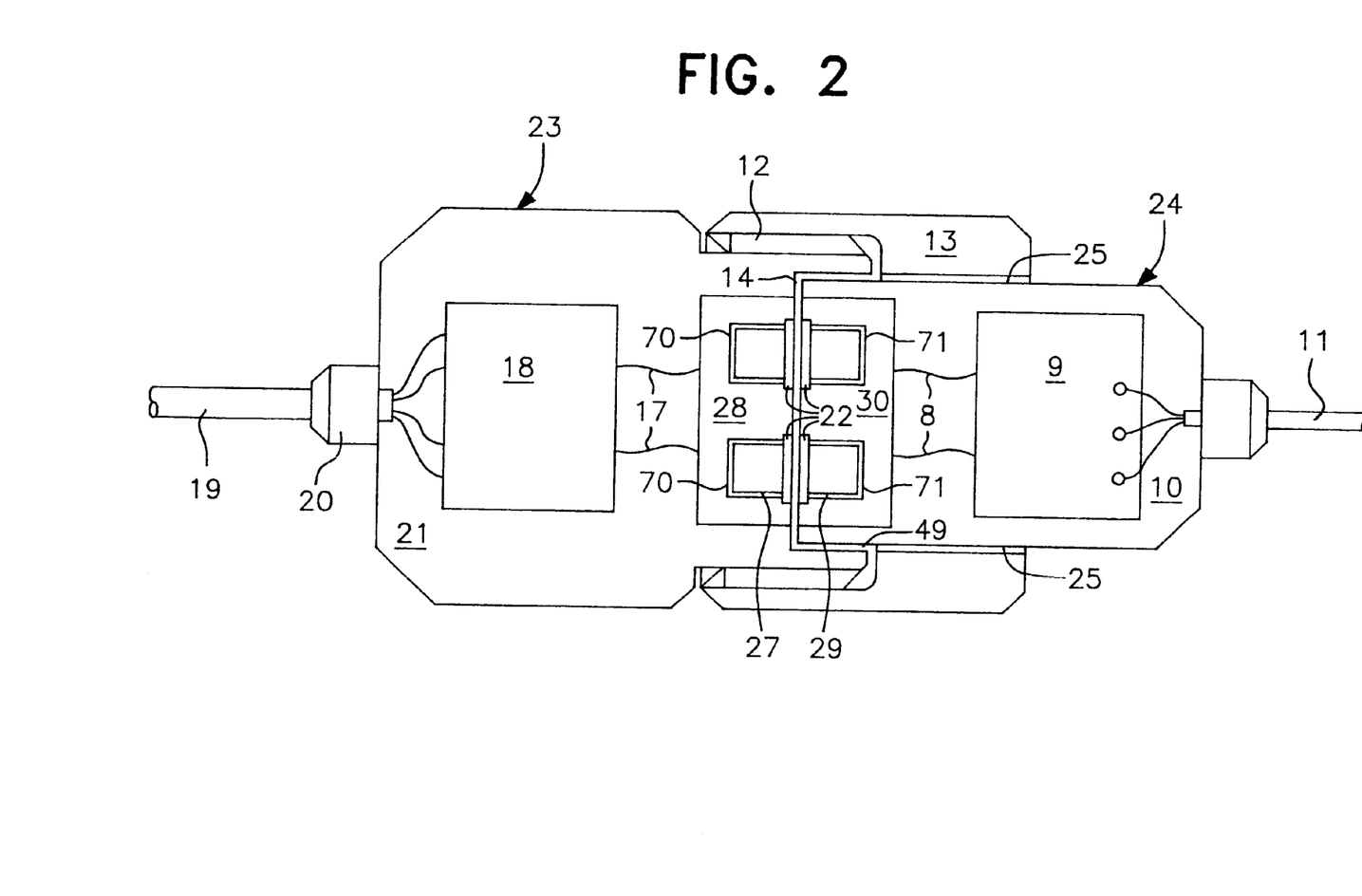
FIG. 2 A cross-section through an alternative embodiment of a plug connection according to the invention.

The plug connection shown in FIG. 2 is largely identically constructed to the plug connection of FIG. 1. The coinciding components are given the same reference numerals as in FIG. 1 and will not be described again. However, a difference relates to the design of the primary-side coil 27 and the associated primary-side ferrite core 28, as well as the secondary-side coil 29 and the associated secondary-side ferrite core 30. The arrangements of coil and ferrite core are identical on the primary and secondary sides. The ferrite cores 28, 30 are cup-shaped with facing cup insides. They in each case have a cup core, i.e. in the centre of the cup a cylindrical pin projects to the same height has the cup walls. Round said cylindrical pin is wound in each case the coil 27, 29. The coils 27, 29 substantially fill the entire interior of the ferrite cores 28, 30. When the plug connection is completely plugged together, the primary-side coil 27 and secondary-side coil 29 are coaxially and directly adjacently arranged. The coils 27, 29 are in each case covered with an insulation 22 and are also insulated by an insulation 70, 71 against the ferrite cores 28, 30 surrounding them.

Figure 3:
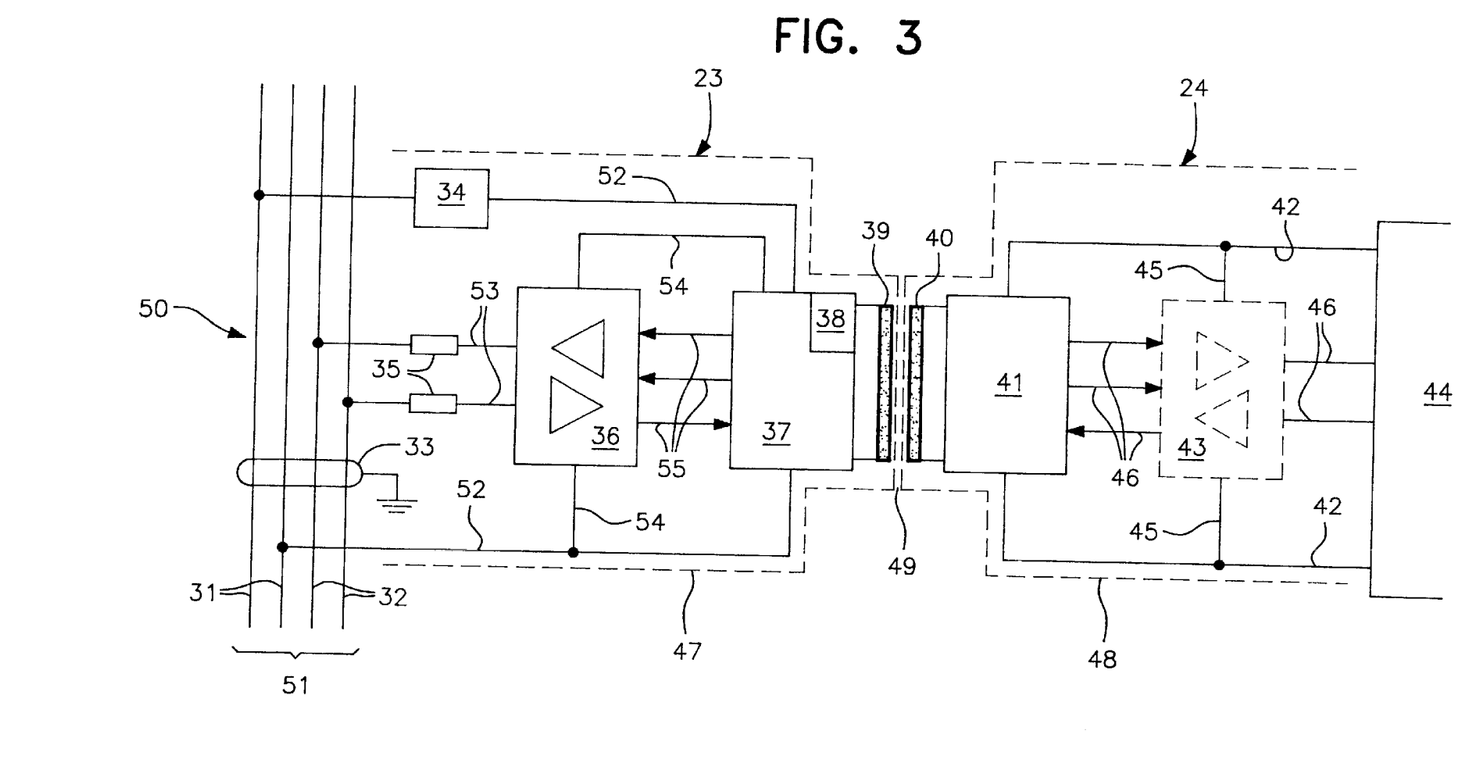
FIG. 3 A block circuit diagram of an energy and data transmission system according to the invention.

FIG. 3 shows to the left a detail of a bus line 51 with two energy lines 31, two data lines 32 and a shield 33. Energy and data are generated by not shown energy and data sources and fed into the bus line 51. The electrical values on the energy lines 31 can e.g. be 24 V and 4 A. The complete bus system is designed in a nodal point arrangement. At a nodal point 50 the energy lines 31 and data lines 32 of the bus line 51 are connected to branch lines 52 for the energy lines 31 and branch lines 53 for the data lines 32. The nodal point is designed as a terminal in the type of protection "increase safety" or as a rigid connection, e.g. as a soldered joint in accordance with the type of protection "increase safety".

The interrupted line 47 diagrammatically represents the casing of a plug primary part 23. The interrupted line 48 diagrammatically represents the casing of a plug secondary part 24.

Into the upper branch line 52 is introduced a limiting means 34 for the electric power, through which the electric power consumed by the energy lines 31 of the bus line 51, as desired, can be limited to the maximum allowed electric powers according to the type of protection of a load 44 connected to the nodal point 50. Thus, the limiting means 34 serves to maintain the type of protection of the primary part (e.g. m, d) and the secondary part, because the transmitted energy is always lower than the supplied energy.

In both branch lines 53 of the data lines 32 is introduced a limiting means 35, which also fulfils limiting functions and ensures the maintaining of the primary-side type of protection (e.g. m, d) and in the case of a transmission procedure using contacts also provides the secondary type of protection.

The branch lines 53 of the data lines 32 are supplied to a transceiver 36. The physical interface is e.g. RS485. Into the transceiver 36 also pass the energy supply lines 54 and connection lines 55 for data, which are connected to an electronic module 37 with a modulator-demodulator. In said unit there is a conversion of the electrical quantities received from the bus line 51 into electrical quantities suitable for transmission in an associated plug connection system. In this case it is an inductively operating plug connection system, e.g. in accordance with the embodiment of FIGS. 1 and 2. the electrical quantities converted by the modulator-demodulator of module 37 are supplied to a primary-side coil 39 and from the latter are inductively transmitted into a secondary-side coil 40. To the secondary-side coil 40 is connected a secondary-side electronic module 41 with a modulator-demodulator, which transforms the electrical signal form suitable for inductive transmission into a form suitable for further processing to the load 44. The secondary-side modulator-demodulator 41 is connected via connecting lines 46 either by means of an optionally provided secondary-side transceiver 43 or directly to the load 44. By means of supply voltage lines 42 the energy necessary for the operation of load 44 is transmitted thereto from the secondary-side modulator-demodulator 41. The optionally provided secondary-side transceiver 43 is also connected by means of energy branch lines 45 to the supply voltage line 42.

Answer-back data from the load 44 pass through the represented arrangement in the reverse order. The entire primary part 23 is e.g. constructed in the type of protection (m, d, q, p) or some other type of protection or a combination thereof. The entire secondary part 24 is e.g. constructed in the type of protection (i) or some other type.

It is optionally also possible to supply a load 44, which is constructed e.g. in the type of protection (e, m, d, q, p) or a combination thereof.

It is also possible to connect simple equipment. To this end with the primary-side electronic module 37 is associated a monitoring circuit 38, which monitors the type of protection of the connected load 44 and adapts the values of the electrical quantities transmittable from the primary-side coil 39. With the secondary part 24 removed there is a setting to values for the type of protection "intrinsically safe". It can be a power of e.g. 2 W necessary for maintaining monitoring. Through inductive coupling in through the two coils 39, 40, the monitoring circuit 38 receives self-identification data from the secondary side, i.e. for example from the load 44 or a component associated with the plug secondary part 24. Only if the monitoring circuit 38 has safely established from the self-identification data of the secondary side that the complete arrangement, which is connected to the plug primary part 23, is subject to a type of protection other than intrinsically safe, does the monitoring circuit 38 transfer a signal to the power limiting means 34 and 35 and they limit the electric power from the bus line 51 to a maximum value in accordance with the type of protection of the connected equipment. If self-identification data from the secondary side are not clearly determined, the monitoring circuit 38 instructs the power limiting means 34, 35 to limit the power to values allowed for the type of protection "intrinsically safe". This arrangement is constructed in a multiple "fail-safe" form, which in detail is not apparent from the drawings.

The monitoring circuit 38 fulfils a special function with respect to an air gap 49 between the two coils 39 and 40. This air gap 49 is e.g. necessary for maintaining the requirements with respect to the type of protection and must not be increased, in that e.g. the two plug halves are pulled apart. Therefore the monitoring circuit 38 detects an increase in the size of the air gap 49 and instantaneously ensures in such a case that the electric power transmittable from the primary-side coil 39 is limited to values allowed for the type of protection "intrinsically safe".

With reference to FIGS. 1 and 2, this is achieved in that a loosening of the box nut 13, which could give rise to a pulling apart of primary part 23 and secondary part 24 and therefore to an increase in the air gap 49, is reliably detected and leads to the aforementioned measures. It is also possible to provide a mechanical protection, through which a screwing of the thread 12 is always linked with the separation of the primary and the secondary-side coil 5, 27, 2, 29, which deteriorates the transmission efficiency.

As stated hereinbefore, the transformation of the transmission type from type of protejction (e) to type of protection "intrinsically safe" (i) takes place in the plug primary part 23.

Figure 4:
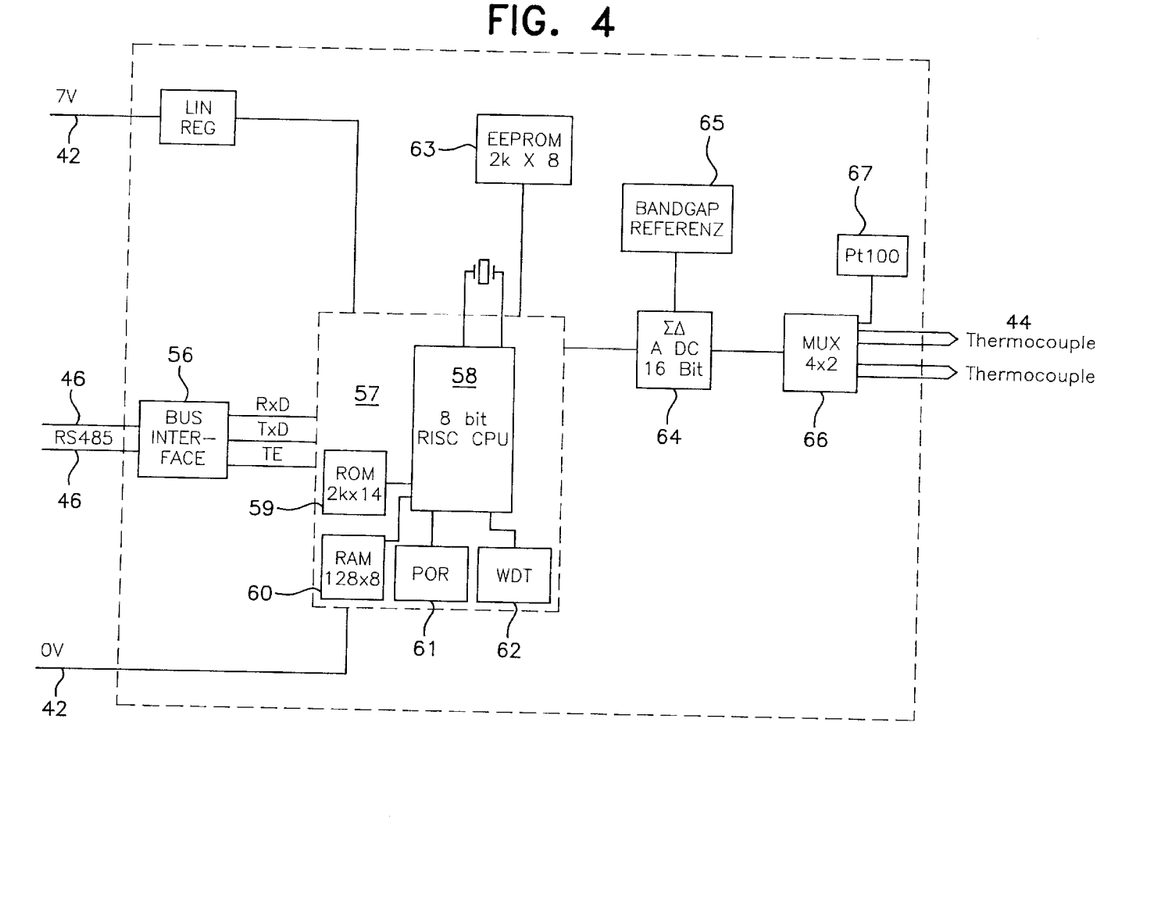
FIG. 4 The electronics of an intelligent sensor.

FIG. 4 shows the electronics of an intelligent sensor. In order not to overburden the representation, the energy supply lines of the individual components are not shown in FIG. 4. The reference numerals for components shown in preceding drawings coincide with those in FIG. 4 and these components will not be described again.

The data are supplied by means of a transceiver 56 to an electronic module 57, which has a microprocessor 58 and associated peripherals. It is a ROM 59, a RAM 60, a power-on reset (POR) module 61 and a Watch Dog Timer (WDT) 62. An EEPROM 63 is also associated with the electronic module 57. All these components are located in the secondary part 24 of the plug connection. The address of the associated sensor is stored in EEPROM 63 and, activated by the microprocessor 58, the sensor electronics are preferably only activated if data addressed to the associated plug are inputted on signal lines 32. Otherwise the microprocessor 58 advantageously disconnects the electronics as required.

The signals delivered by the electronic module 57 are supplied accross further signal processing components to the load 44. It is an analog-digital converter 64, a band gap reference 65, a multiplexer 66 and a connected Pt100 67. The operation of these components will not be described in detail here. The components are fundamentally used for obtaining precise data from the sensor 44, which is in this case a thermocouple.

The electronic module 57 and EEPROM 63 can alternatively be housed in the primary part 23 of the plug connection. The address 63 of the nodal point is then stored in the EEPROM 63.

Figure 5:
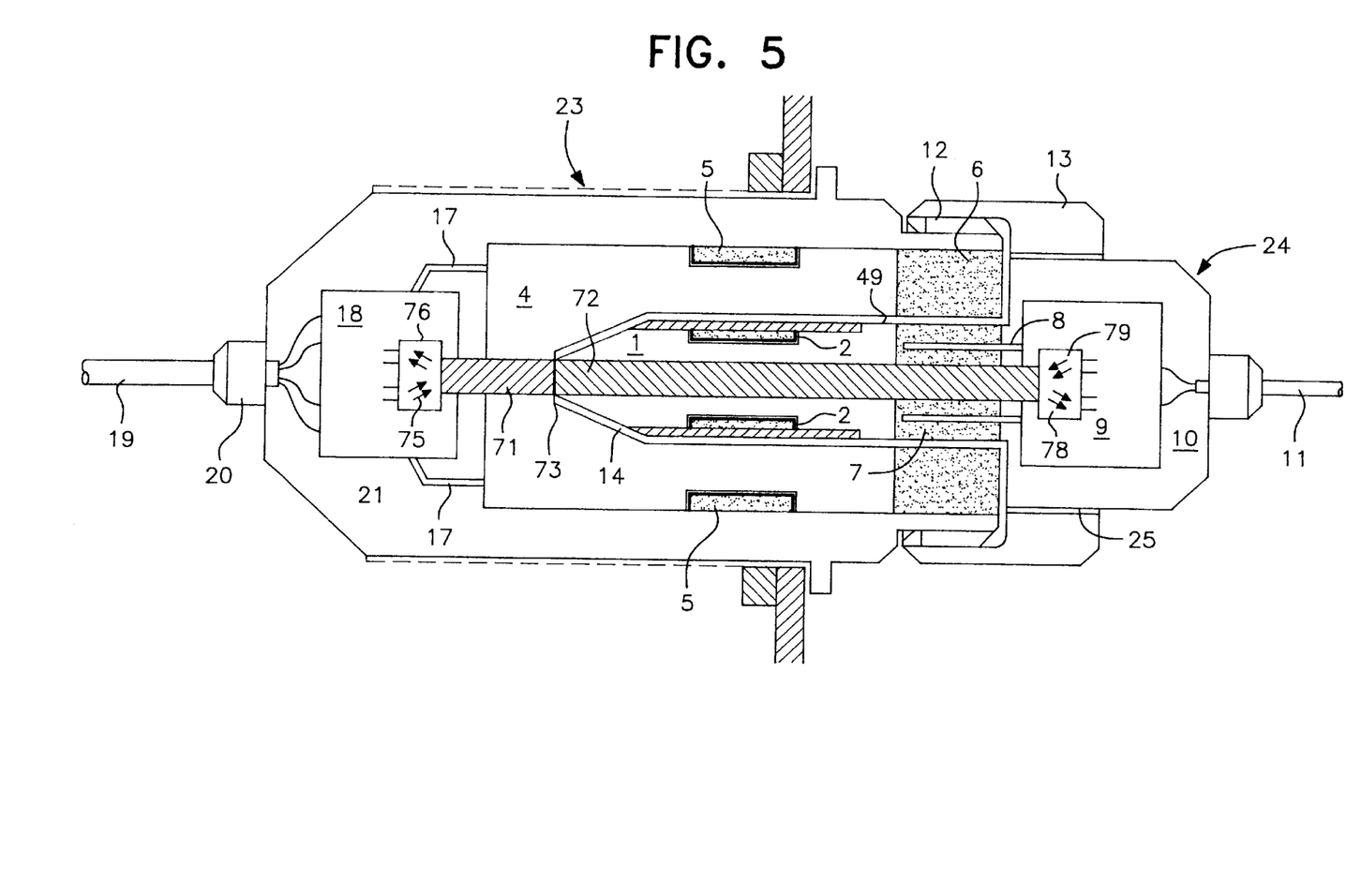
FIG. 5 A section through a plug connection according to the invention and FIG. 1, but with an optical data transmission device.

FIG. 5 shows another embodiment of a plug connection according to the invention with a section in the longitudinal direction like the plug connection of FIG. 1. Once again the same reference numerals are used for identical subassemblies.

However, in the case of FIG. 5 the primary part 23 and secondary part 24 are designed for optical data transmission. For this purpose a light-conducting rod 71 is provided substantially coaxially to the longitudinal axis in primary part 23 and in the electronic module 18 is coupled to a transmitter 75 and a receiver 76.

A corresponding light-conducting rod 72 is provided in the longitudinal axis in the secondary part 24 and has in the corresponding electronic module 9 of the secondary part a receiver 78 and a transmitter 79. The corresponding light-conducting rods 71, 72 can be designed as glass fibres for optical data transmission and the glass fibre cross-section is roughly circular cylindrical.

The faces of the light conducting rods 71, 72 face one another in planar manner substantially in the centre of the conically tapering part of the secondary part, so that optical losses are largely prevented.

Data supplied to the primary part 23 are therefore converted by the transmitter 75 into optical signals and transmitted by light-conducting rod 71 to light conducting rod 72 and from there feeding into the receiver 78 takes place, which converts the optical data into electrical signals.

The data transmission path from the secondary part 24 takes place via transmitter 79 to the primary part receicer 76, in which the optical signals are converted into electrical signals. The separation of energy and data transmission has the advantage that interference effects are reduced and the data transmission rate can be made independent of the energy transfer.

What is claimed is:
1. Plug connection for a hazardous location for energy and data transmission between at least one electrical load and a bus system, said plug connection having a primary part and secondary part constructed as transmitters, said primary part and said secondary part being separable and connectable; and said primary part being associated with a converter, wherein said bus system is connected to said plug connection in each case via separate energy and data supply lines, at least in the primary part are provided limiting means for the electrical quantities to be transmitted, and at least the secondary part is associatable with the hazardous location.

2. Plug connection according to claim 1, wherein the transmitter is designed inductively with "safe galvanic separation".

3. Plug connection according to claim 1, wherein the primary part and optionally also the secondary part in each case have a transceiver and that at least one of the primary part and the secondary part have a microprocessor and an addressable memory, particularly an EEPROM.

4. Plug connection according to claim 1, wherein the primary part has a device for monitoring the load connected to the secondary part and the limiting means for limiting the electrical quantities to be transmitted to the secondary part are limited to values that meet the requirements for at least one of International Electrotechnical Commission, IEC protection methods "e", "i", "m", "d", "p", and "q", Verband Deutscher Elektrotechniker, VDE protection method "s", and International Electrotechnical Commission, IEC protection method "o".

5. Plug connection according to claim 4, wherein the load monitoring device only activates the energy transmission of the primary part when a signal is received from the secondary part ensuring that the connected load operates correctly.

6. Plug connection according to claim 1, wherein between said primary part and said secondary part an air gap is formed which meets the requirements of International Electrotechnical Commission, IEC protection method "d" and a protective device for monitoring the air gap is provided.

7. Plug connection according to claim 1, wherein said secondary part has a non-volatile memory for storing at least one of address and further characteristics of at least one of the plug connection and the connected load, said secondary part contains a monitoring device for data supplied by the bus system and the monitoring device, on receiving from the bus system data addressed to said secondary part of the plug connection, activates the electronic components of the secondary part.

8. Plug connection according to claim 6, wherein said primary part has a coil provided in a primary-side ferrite core with an insulation, said secondary part has a coil wound around a mandrel-like ferrite core and surrounded by insulation and said mandrel-like ferrite core, when the plug connection is plugged together, is introduced into a recess of the primary-side ferrite core in such a way that the coil of the primary-side ferrite core and the coil of the mandrel-like ferrite core of the secondary part are arranged coaxially and in the same axial segment.

9. Plug connection according to claim 8, wherein said primary part has an end face with an annular attachment, which is constructed as a centering device and spacing part, made from a magnetically poorly conducting material and the mandrel-like, secondary-side ferrite core has a base segment also made from a magnetically poorly conducting material.

10. Plug connection according to claim 6, wherein said primary part comprises a primary-side ferrite core and said secondary part comprises a secondary-side ferrite core, said primary-side ferrite core and said secondary-side ferrite core are in each case in the form of a cup with a cup core and around the particular cup core in each case is wound a coil, which is insulated and in the assembled state of the plug connection oriented coaxially with their faces against one another.

11. Plug connection according to claim 1, wherein there is an optical device for data transmission between said primary part and said secondary part.

12. Plug connection according to claim 11, wherein the optical device in the primary part has a light-conducting rod coupled to a light-conducting rod in the secondary part and that on both sides there are transmitters and receivers for opto-electronic data conversion.

13. Plug connection according to claim 1, wherein there is a device, provided with electrical contacts, for the transmission of electrical quantities between primary part and secondary part.

14. Plug connection according to claim 1, wherein the bus system has at least two electrical lines for energy transmission, at least two electrical lines for information transmission and a shield.

15. Plug connection according to claim 1, wherein the bus system is constructed in the nodal point arrangement and the nodal points are terminals that meet the requirements of International Electrotechnical Commission, IEC protection method "increased safety e".

16. Energy and data transmission method for hazardous locations, in which energy and data can be transmitted by means of a bus system to a primary part of at least one plug connection according to claim 1 and which energy and data are transmittable from a secondary part of the plug connection to at least one load, wherein the primary part the type of protection of the connected load is determined and that the electrical quantities to be transmitted are limited to maximum values corresponding to the determined type of protection.

17. Energy and data transmission method according to claim 16, wherein the maximum values of the electrical quantities to be transmitted, with the secondary part removed, are limited to values that meet the requirements of International Electrotechnical Commission, IEC protection method "intrinsically safe i" or to values that meet the requirements for "protection method simple equipment".

18. Plug connection according to claim 15, wherein the nodal points are rigid connections.

19. Plug connection according to claim 15, wherein the nodal points are soldered joints that meet the requirements of Electrotechnical Commission, IEC increased safety protection method "e".

20. Plug connection for a hazardous location for energy and data transmission between at least one electrical load and a bus system, said plug connection having a primary part and secondary part constructed as transmitters, said primary part and said secondary part being separable and connectable; and said primary part being associated with a converter, wherein said bus system is connected to said plug connection in each case via separate energy and data supply lines, at least in the primary part are provided limiting means for the electrical quantities to be transmitted, and at least the secondary part is associatable with the hazardous location, wherein the primary-side casing of the plug connection is designed to meet the requirements of at least one of International Electrotechnical Commission, IEC protection method "pressure-tight enclosure d" and International Electrotechnical Commission, IEC protection method "sealed enclosure m" or to meet the requirements of one of International Electrotechnical Commission, IEC protection methods "p" and "q", Verband Deutscher Elektrotechniker, VDE protection method "s", and Electrotechnical Commission, IEC protection method "o", the supply lines of the bus system are constructed as three or four-wire lines, the plug connection is designed for bidirectional data transmission and the primary part and secondary part in each case have a modulator-demodulator-device for data.

21. Plug connection for a hazardous location for energy and data transmission between at least one electrical load and a bus system, said plug connection having a primary part and secondary part constructed as transmitters, said primary part and said secondary part being separable and connectable; and said primary part being associated with a converter, wherein said bus system is connected to said plug connection in each case via separate energy and data supply lines, at least in the primary part are provided limiting means for the electrical quantities to be transmitted, and at least the secondary part is associatable with the hazardous location, wherein between said primary part and said secondary part an air gap is formed which is adapted to meet the requirements of Electrotechnical Commission, IEC protection methods protection method "d" and a protective device for monitoring the air gap is provided, wherein said primary part has a coil provided in a primary-side ferrite core with an insulation, said secondary part has a coil wound around a mandrel-like ferrite core and surrounded by insulation and that said mandrel-like ferrite core, when the plug connection is plugged together, is introduced into a recess of the primary-side ferrite core in such a way that the coil of the primary-side ferrite core and the coil of the mandrel-like ferrite core of the secondary part are arranged coaxially and in the same axial segment, wherein the air gap extends from a space between the primary-side ferrite core and the secondary-side ferrite core to a locking mechanism between a box nut and the primary-side plug casing, as well as a space between the box nut and a secondary-side plug casing.

22. Plug connection according to claim 21, wherein the locking mechanism is a threaded connection.

23. Plug connection according to claim 21, wherein the locking mechanism is a bayonet closure.

24. Plug connection for a hazardous location for energy and data transmission between at least one electrical load and a bus system, said plug connection having a primary part and secondary part constructed as transmitters, said primary part and said secondary part being separable and connectable; and said primary part being associated with a converter, wherein said bus system is connected to said plug connection in each case via separate energy and data supply lines, at least in the primary part are provided limiting means for the electrical quantities to be transmitted, and at least the secondary part is associatable with the hazardous location, wherein between said primary part and said secondary part an air gap is formed which is adapted to meet the requirements of Electrotechnical Commission, IEC protection method "d" and a protective device for monitoring the air gap is provided, wherein said primary part comprises a primary-side ferrite core and said secondary part comprises a secondary-side ferrite core, said primary-side ferrite core and said secondary-side ferrite core are in each case in the form of a cup with a cup core and that around the particular cup core in each case is wound a coil, which is insulated and in the assembled state of the plug connection oriented coaxially with their faces against one another, wherein the air gap extends from a space between the primary-side ferrite core and the secondary-side ferrite core to a locking mechanism between a box nut and the primary-side plug casing, as well as a space between the box nut and a secondary-side plug casing.

25. Plug connection according to claim 24, wherein the locking mechanism is a threaded connection.

26. Plug connection according to claim 18, wherein the locking mechanism is a bayonet closure.

* * * * *